INVENTOR.
ALFRED WINKLER
KARL WAGNER
BY KARL BAMMESBERGER
HEINZ ERNST

United States Patent Office 3,623,414
Patented Nov. 30, 1971

3,623,414
RECEPTACLE AND FRAME COUNTER MEANS FOR PHOTOGRAPHIC FILM
Alfred Winkler, Munich, Karl Wagner, Ottobrunn, and Karl Bammesberger and Heinz Ernst, Munich, Germany, assignors to Agfa-Gevaert Aktiengesellschaft, Leverkusen, Germany
Filed Apr. 24, 1970, Ser. No. 31,654
Claims priority, application Germany, Apr. 30, 1969, P 19 21 978.4
Int. Cl. G03b 19/04
U.S. Cl. 95—31 FM
10 Claims

ABSTRACT OF THE DISCLOSURE

A film frame counter which is installed in a housing constituting a cassette or the body of a still camera for roll film of the type having a row of perforations, one for each film frame. The frame counter comprises an indexible wheel which is mounted on the rear wall of the cassette or camera body and has an annulus of elastic arms one of which is urged against the film by an inclined elastic cam so that it enters an oncoming perforation and indexes the wheel by a step whenever the film is advanced by the length of a frame. The wheel is connected with a numbered disk which travels along a fixed marker to indicate the number of exposed or unexposed film frames.

CROSS-REFERENCE TO RELATED APPLICATION

The receptable of the present invention constitutes an improvement over and a further development of the receptacle which is disclosed in the copending application Ser. No. 852,012, filed Aug. 21, 1969 by Landbrecht et al. and assigned to the same assignee.

BACKGROUND OF THE INVENTION

The present invention relates to photographic apparatus in general, and more particularly to improvements in frame counters for photographic roll film of the type having a series of film frames and a row of perforations, one for each film frame.

The aforementioned copending application Ser. No. 852,012 discloses a receptacle for photographic roll film wherein the frame counter comprises an indexible disk mounted on the film-accommodating housing (which may constitute a cassette for roll film or the body of a still camera) and an elastic one-piece actuating member which is provided with a detector serving to penetrate into oncoming perforations and to effect angular displacement of the disk. Such frame counters are quite simple and reliable; however, the actuating member requires a relatively large amount of space for pivotal movement about an axis which does not coincide with the axis of the disk.

SUMMARY OF THE INVENTION

An object of the present invention is to provide the housing of a receptacle for roll film of the aforementioned type with a novel and improved frame counter which is simple, inexpensive and occupies even less room than the frame counter of the aforementioned copending application Ser. No. 852,012.

Another object of the invention is to provide a frame counter wherein the indexible disk or wheel can receive motion directly from photographic film.

A further object of the invention is to provide a frame counter which can be installed in or on cassettes for roll film or directly in or on the body of a still camera.

An additional object of the invention is to provide a frame counter which can be installed in or on presently known cassettes or camera bodies.

The improved comprises a film-accommodating housing, transporting means for moving the film in the housing lengthwise, and a frame counter including an indexible member which is rotatably supported by the housing for movement between a plurality of angular positions each representing a different number of exposed or unexposed film frames, and an annulus of elastic arms provided on the indexible member, one for each position of the indexible member. The arms are movable with the indexible member along a circular path a portion of which registers with or overlaps the row of perforations on the film. Each of the arms normally assumes a retracted or ineffective position and is movable to an extended position in which the arm, while located in the aforementioned portion of the circular path, enters an oncoming perforation to thereupon index the indexible member. The frame counter further comprises a cam or analogous displacing means provided in the housing adjacent to the aforementioned portion of the circular path for moving successive arms from retracted to extended positions and for maintaining such arms in extended positions while the indexible member moves from a preceding to the next-following angular position in response to transport of the film by the length of a frame.

The indexible member may be provided with symbols which are indicative of its angular positions; however, it is also possible to provide a numbered disk which rotates in response to rotation of the indexible member to thereby move its digits into registry with a stationary marker on the housing.

The novel features which are considered as characteristic of the invention are set worth in particular in the appended claims. The improved receptacle itself, however, both as to its construction and the mode of utilizing the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
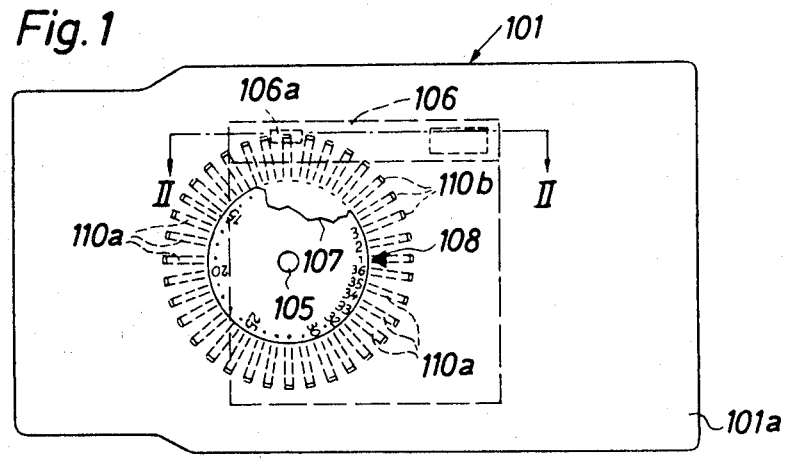
FIG. 1 is a rear elevational view of a receptacle including a frame counter which embodies the invention.

The drawing illustrates a receptacle having a housing 101 for a supply of photographic roll film 103 of the type having a series of film frames and a row of perforations 103a, one for each film frame. The housing 101 constitutes a cassette which can be inserted into a still camera and includes a first portion 101A containing a supply of unexposed roll film, a second portion 101B which accommodates exposed film, and an intermediate portion 101D which supports a novel frame counter. The intermediate portion 101D includes a front wall 104 which constitutes a platform and is provided with a window to expose to scene light that film frame which is located behind the objective of the camera. An intermediate wall or partition 106 of the portion 101D is located behind and is parallel to the front wall 104; these walls define a narrow channel wherein the film 103 is moved lengthwise in a direction from the portion 101A toward the portion 101B. The housing 101 further comprises a rear or outer wall 101a which is spaced from and located behind the partition 106 to define therewith a compartment 101E.

The compartment 101E accommodates an indexible wheel 110 which forms part of the improved frame counter. This wheel has a shaft 105 which is normal to the planes of the walls 104, 106, 101a and is journalled in the wall 101a. The outer end of the shaft 105 carries a disk 107 which is outwardly adjacent to the rear wall 101a and shares all angular movements of the indexible wheel 110. The exposed surface of the disk 107 is provided with numerals "1" through "36" each of which represents a different number of exposed or unexposed film frames. Whenever the indexible wheel 110 is at a standstill, one of the numerals on the disk 107 registers with a stationary marker 108 provided on the outer side of the rear wall 101a.

Figure 2:
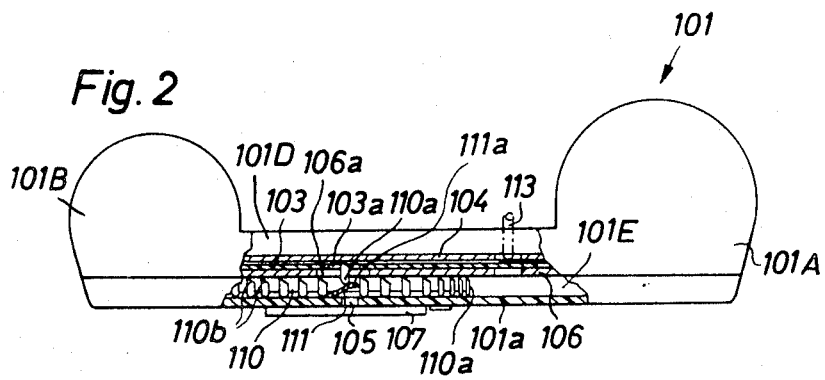
FIG. 2 is a top plan view of the receptacle with a portion of its housing shown in section as seen in the direction of arrows from the line II—II of FIG. 1.

The indexible wheel 110 is provided with an annulus of radially extending elastic arms 110a, one for each angular position of the wheel, i.e., one for each numeral on the disk 107. Each of these arms tends to assume a normal or retracted position in which its bent-over end portion or tip 110b is located behind the plane of that film frame which registers with the window in the front wall 104. The arms 110a travel along a circular path a portion of which registers with the straight path along which the perforations 103a of the film 103 travel when the film is transported lengthwise to introduce exposed frames into the portion 101B of the housing 101. The intermediate wall 106 is provided with an aperture or cutout 106a which is adjacent to the aforementioned portion of the circular path for the end portions 110b of the arms 110a. The arms 110a are movable from their retracted positions in a direction substantially at right angles to the planes of the walls 104, 106, 101a so that their end portions 110b can pass through the aperture 106a and to assume extended or operative positions in which they bear against the rear side of the film 103 at the level of the row of perforations 103a. Such movement of successive arms 110a from retracted to extended positions is effected by an inclined elastic displacing cam 111 which is mounted at the inner side of the wall 101a behind the aperture 106a. The effective length of the face on the cam 111 at least equals the angular distance between two adjoining end portions 110b. The purpose of the face on the displacing cam 111 is to hold the end portion 110b of that arm 110a which registers with the aperture 106a in engagement with the rear side of the film 103 so that such end portion penetrates into an oncoming perforation 103a and causes indexing of the wheel 110 in response to lengthwise movement of the film by the length of a frame. The innate tendency of arms 110a to assume their retracted positions causes automatic disengagement or withdrawal of end portions 110b from the perforations 103a when the respective arms 110a advance beyond the face of the cam 111. The film 103 continues to move lengthwise after the end portion 110b of an arm 110a leaves the adjacent perforation 103a until the transport by the length of a frame is completed. When an arm 110a slides off the face of the cam 111, the next-following arm is already in engagement with the cam 111 so that its end portion penetrates into the oncoming perforation 103a during the next-following transport of the film 103. If desired, the cam 111 can be associated with an auxiliary cam or guide (not shown) whose face constitutes an extension of the inclined face on the cam 111 and is substantially parallel to the walls 104, 106. This insures that the wheel 110 and disk 107 rotate through an exactly determined angle in response to each transport of the film by the length of a frame. The film transporting mechanism of the structure shown in FIGS. 1 and 2 comprises a pin or post 113 which enters the perforations 103a and transports the film by the length of a frame. The film transporting mechanism including the post 113 preferably cooperates with the camera release in a manner not forming part of the present invention.

It is clear that the improved receptacle is susceptible of many modifications without departing from the spirit of the present invention. For example, the disk 107 can be omitted if the numerals are applied directly to the rear side of the wheel 110 and if the rear wall 101a is provided with a window which permits observation of one numeral at a time. The arrangement which is shown in the drawing is preferred at this time because the aforementioned window would have to be designed to prevent entry of light into the housing 101. Also, the disk 107 need not be coaxial with the wheel 110, as long as it rotates in synchronism with the wheel. Furthermore, the elastic displacing cam 111 can be replaced with a rigid cam if the front wall 104 is provided with a suitable depression facing the aperture 106a or if the arms 110a are simply caused to flex the film 103 during engagement of their end portions 110b with that part of the film which moves along the aperture 106a. Finally, the housing 101a can be replaced with the body of a still camera, substantially in the same way as illustrated in FIG. 5 of the aforementioned copending application Ser. No. 852,012.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. A receptacle for photographic roll film of the type having a series of frames and a row of perforations, one for each frame, comprising a film-accommodating housing; transporting means for moving the film in said housing lengthwise; and a frame counter including an indexible member rotatably supported by said housing for movement between a plurality of angular positions each representing a different number of frames, said member having an annulus of elastic arms, one for each of said positions and arranged to travel along a circular path a portion of which registers with said row of perforations, each of said arms normally assuming a retracted position and being movable to an extended position in which the arm which is located in said portion of said circular path enters an oncoming perforation to thereupon index said member, and displacing means provided on said housing adjacent to said portion of said circular path for moving successive arms from retracted to extended positions and for maintaining such arms in extended positions while said indexible member moves from a preceding to the next-following angular position in response to transport of the film by the length of a frame.

2. A receptacle as defined in claim 1, wherein said housing defines for the film a channel which is adjacent to said indexible member and wherein the film is located in a plane which is normal to the axis of said member, said arms moving substantially at right angles to said plane during movement between retracted and extended positions.

3. A receptacle as defined in claim 1, wherein said displacing means comprises an elastic cam which is secured to said housing.

4. A receptacle as defined in claim 1, wherein said housing comprises a wall separating the film from said indexible member and having an aperture through which an arm in the extended position thereof extends during travel along said portion of said circular path.

5. A receptacle as defined in claim 1, wherein said frame counter further comprises a disk rotatably supported by said housing and receiving motion from said indexible member to change its position through a predetermined angle in response to each angular displacement of said indexible member between two successive positions.

6. A receptacle as defined in claim 5, wherein said housing comprises an outer wall disposed between said disk and said indexible member, said disk being coaxial with and rigidly secured to said indexible member.

7. A receptacle as defined in claim 1, wherein each of said arms comprises a bent-over end portion which enters the oncoming perforation when the respective arm dwells in said extended position.

8. A receptacle as defined in claim 1, wherein said housing constitutes a cassette for roll film and includes a first portion for storage of a supply of convoluted unexposed film, a second portion for storage of exposed film, and an intermediate portion disposed between said first and second portions said frame counter being mounted on said intermediate portion.

9. A receptacle as defined in claim 1, wherein said housing is provided with market means and said frame counter is provided with a set of symbols each indicating one of said angular positions of said indexible member, said marker means being in registry with one of said symbols whenever said indexible member is at a standstill.

10. A receptacle as defined in claim 1, wherein said displacing means is provided with an inclined face which effects sudden penetration of arms into oncoming perforations and gradual retraction of such arms from the respective perforations.

References Cited
UNITED STATES PATENTS

| | | | |
|---|---|---|---|
| 2,838,984 | 6/1958 | Lareau | 95—31 |
| 3,406,621 | 10/1968 | Irwin | 95—31 FM |
| 3,532,040 | 10/1970 | Ehgartner | 95—31 FM |

SAMUEL S. MATTHEWS, Primary Examiner

M. H. HAYES, Assistant Examiner

U.S. Cl. X.R.

352—172